US012809629B2

(12) United States Patent
Landi et al.

(10) Patent No.: US 12,809,629 B2
(45) Date of Patent: Nov. 24, 2026

(54) REGISTER BANK COMPRISED OF WITHOUT-RESET REGISTERS FOR ELECTRONIC PROCESSOR AND INITIALIZATION METHOD OF THE REGISTER BANK

(71) Applicant: STMicroelectronics International N.V., Geneva (CH)

(72) Inventors: Sofiane Landi, San Mango Piemonte (IT); Enea Dimroci, Borgo San Dalmazzo (IT)

(73) Assignee: STMicorelectronics International N.V., Geneva (CH)

( * ) Notice: Subject to any disclaimer, the term of this patent is extended or adjusted under 35 U.S.C. 154(b) by 118 days.

(21) Appl. No.: 18/438,097

(22) Filed: Feb. 9, 2024

(65) Prior Publication Data

US 2024/0272907 A1 Aug. 15, 2024

(30) Foreign Application Priority Data

Feb. 13, 2023 (IT) ........................ 102023000002409

(51) Int. Cl.
*G06F 9/30* (2018.01)

(52) U.S. Cl.
CPC ...... *G06F 9/30141* (2013.01); *G06F 9/30098* (2013.01); *G06F 9/30105* (2013.01)

(58) Field of Classification Search
CPC ............... G06F 9/3012; G06F 9/30098; G06F 9/30141; G06F 9/30105
See application file for complete search history.

(56) References Cited

U.S. PATENT DOCUMENTS 5,680,641 A * 10/1997 Sidman ................. G06F 9/3885 710/36
5,790,894 A * 8/1998 Childers ............. G06F 9/30141 710/62
7,363,440 B1 * 4/2008 Neuman ................. G06F 13/16 710/39
2004/0060015 A1 * 3/2004 Mochizuki .......... G06F 9/30141 716/117
2004/0107330 A1 * 6/2004 Brown ..................... G11C 7/22 712/E9.019

(Continued)

OTHER PUBLICATIONS

"D Flipflop without reset," URL=https://www.rfwireless-world.com/source-code/VERILOG/D-flipflop-without-reset-verilog-code.html, RF Wireless World, 2012. (4 pages).

(Continued)

*Primary Examiner* — Idriss N Alrobaye
(74) *Attorney, Agent, or Firm* — Seed IP Law Group LLP

(57) ABSTRACT

A register bank includes a plurality of without-reset registers. The register bank has a write input, a write-enable input, and a write-address input coupled to the plurality of without-reset registers. The register bank has a plurality of operating modes, including an initialization mode of operation and a write mode of operation. In the initialization mode of operation, the register bank responds to receipt of a write-enable signal on the write-enable input by storing initialization data received on the write input into a register of the plurality of without-reset registers based on a write-address signal received on the write-address input.

17 Claims, 8 Drawing Sheets

(56) References Cited

U.S. PATENT DOCUMENTS

| | | | | |
|---|---|---|---|---|
| 2004/0225838 | A1* | 11/2004 | Biles | G06F 9/30138 712/E9.046 |
| 2010/0199072 | A1* | 8/2010 | Craske | G06F 9/30141 712/218 |
| 2010/0332712 | A1* | 12/2010 | Galbi | G11C 11/412 710/305 |
| 2020/0301795 | A1 | 9/2020 | Chaurasiya et al. | |
| 2020/0353917 | A1* | 11/2020 | Leitermann | B60W 30/18054 |
| 2022/0019437 | A1* | 1/2022 | Ferguson | G06F 9/3016 |

OTHER PUBLICATIONS

"Pull-up Resistors," URL=https://www.electronics-tutorials.ws/logic/pull-up-resistor.html, Retrieval date Jan. 24, 2024. (13 pages).

Patterson et al., "Computer Organization and Design, The Hardware/Software Interface: RISC-V Edition," Morgan Kaufmann Publishers, 2018. (1665 pages).

Waterman et al., "The RISC-V Instruction Set Manual, vol. I: Base User-Level ISA," Technical Report No. UCB/EECS-2011-62, Electrical Engineering and Computer Sciences University of California at Berkeley, May 13, 2011. (34 pages).

Weste et al., "CMOS VLSI Design: A Circuits and Systems Perspective," Fourth Edition, Addison-Wesley Publication, 2011. (867 pages).

* cited by examiner

REGISTER BANK COMPRISED OF WITHOUT-RESET REGISTERS FOR ELECTRONIC PROCESSOR AND INITIALIZATION METHOD OF THE REGISTER BANK

BACKGROUND

Technical Field

The present disclosure relates to an improved register bank for electronic processor and to an initialization method of the register bank.

Description of the Related Art

Nowadays, electronic applications have an increasingly widespread transition to the digital domain for the execution of required functionalities and operations. The growing demand for digital data processing capability requires ever greater occupation of the processor area for performing these functionalities and operations.

For example, "Micro Processing Units" (MPU) have gained widespread thanks to their performances in terms of control, data processing and debugging capabilities.

Several families of MPUs are known. In particular, an open-source solution space, called RISCV, has been commonly used lately.

The RISCV processors are becoming the main choice for implementing generic control logic in IoT applications. This occurs thanks to their open-source nature, which allows greater flexibility of use and customization by the processor designer. In fact, the designer may write code in a high-level language (e.g., C, python, etc.), may translate this code into machine language using a compiler of known type and may make the processor execute the instruction list in the machine language, all this in an independent and autonomous manner.

For this type of application there are usually present one or more sensors, an analog chain for processing the signals coming from the sensors, and the RISCV processor for processing the information coming from the sensors and for performing operations on the basis of this information.

However, RISCV processors have a significant area size. In particular, the RISCV processor comprises a register bank (also called "register file") which is normally alone responsible for about 70% of the overall occupation of the processor area.

As known, a greater area occupation causes higher costs and power consumption of the processor, as well as a greater risk of congestion of the electrical signals through the electrical connections present in the processor.

One cause of this considerable area occupation and difficult scalability of the register bank is the need to be able to initialize the registers of the register bank to default values (e.g., to be able to reset the memory elements of the registers). This is currently done using, for each memory element, a respective reset line which, when necessary, carries a reset signal to the memory element which causes the initialization thereof. This initialization normally occurs in parallel and therefore substantially simultaneously for all the memory elements of the registers of the register bank, providing each of them with the reset signal through the respective reset line. However, as evident, having a reset line for each memory element causes a considerable occupation of the processor area. Nonetheless, this solution is commonly adopted as it allows the registers of the register bank to be initialized whenever the processor needs to execute a sequence of instructions to complete a task. In fact, without this initialization the processor would not be able to process the right information and therefore could not function properly.

BRIEF SUMMARY

According to the present disclosure, there are provided a register bank, an electronic processor comprising the register bank, an initialization method of the register bank, a control method of the electronic processor and a computer program product thereof.

In an embodiment, a register bank includes a plurality of without-reset registers. The register bank has a write input, a write-enable input, and a write-address input coupled to the plurality of without-reset registers. The register bank has a plurality of operating modes, including an initialization mode of operation and a write mode of operation. In the initialization mode of operation, the register bank responds to receipt of a write-enable signal on the write-enable input by storing initialization data received on the write input into a register of the first plurality of without-reset registers based on a write-address signal received on the write-address input.

In an embodiment, an electronic processor includes a register bank, control circuitry and a multiplexer. The register bank includes a first plurality of without-reset registers, a write input coupled to the first plurality of without-reset registers, a write-enable input coupled to the first plurality of without-reset registers, and a write-address input coupled to the first plurality of without-reset registers. The register bank has a plurality of operating modes including an initialization mode of operation and a write mode of operation. In the initialization mode of operation, the register bank responds to receipt of a write-enable signal on the write-enable input by storing initialization data received on the write input into a register of the first plurality of without-reset registers based on a write-address signal received on the write-address input. The control circuitry is coupled to the register bank, and, in operation, the control circuitry generates a control signal, the write-enable signal and the write-address signal. The multiplexer has a plurality of data inputs including: a first data input, which, in operation, receives operating data signals; a second data input, which, in operation, receives initialization data signals; a control input coupled to the control circuitry. In operation, the control input receives the control signal. The multiplexer has an output coupled to the write input of the register bank, and the multiplexer, in operation, couples one of the plurality of data inputs of the multiplexer to the output of the multiplexer based on the control signal.

In an embodiment, a method comprises operating a register bank having a plurality of operational modes in an initialization mode of operation, the plurality of operational modes including the initialization mode of operation and a write mode of operation, and responding to receipt of a write-enable signal by the register bank during the initialization mode of operation by storing initialization data into a register of a plurality of without-reset registers of the register bank based on a write-address received by the register bank.

In an embodiment, a method comprises operating a processor having a register bank in one of a plurality of operational modes, the plurality of operational modes including a reset mode, a write mode, and a read mode, responding to receipt of a write-enable signal by the register bank during the reset mode of operation by storing initialization data into one or more registers of a plurality of without-reset registers of the register bank based on write-addresses received by the register bank, and responding to receipt of a write-enable signal by the register bank during the write mode of operation by storing operating data into one or more registers of the plurality of without-reset registers of the register bank based on write-addresses received by the register bank.

In an embodiment, a non-transitory computer-readable medium's contents cause a processing system to perform a method. The method comprises: operating the processing system in one of a plurality of operational modes, the plurality of operational modes including a reset mode, a write mode, and a read mode; responding to receipt of a write-enable signal by a register bank of the processing system during the reset mode of operation by storing initialization data into one or more registers of a plurality of without-reset registers of the register bank based on write-addresses received by the register bank; and responding to receipt of a write-enable signal by the register bank during the write mode of operation by storing operating data into one or more registers of the plurality of without-reset registers of the register bank based on write-addresses received by the register bank.

BRIEF DESCRIPTION OF THE SEVERAL VIEWS OF THE DRAWINGS

For a better understanding of the present disclosure, example embodiments are now described, purely by way of non-limiting example, with reference to the attached drawings, wherein.

In the following description, elements common to the different embodiments have been indicated with the same reference numerals.

DETAILED DESCRIPTION

Figure 1:
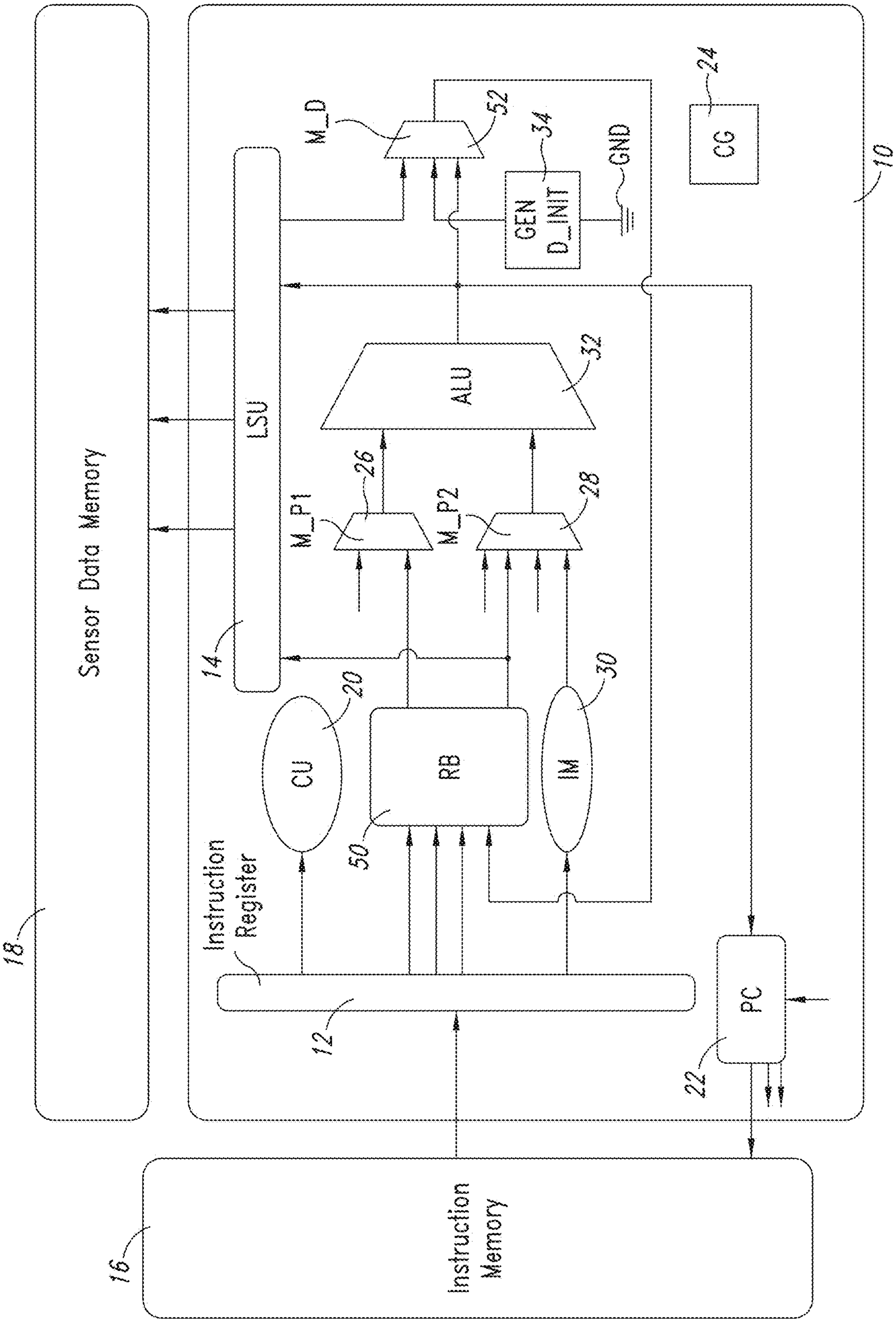
FIG. 1 schematically shows the structure of a processor, according to an embodiment.

FIG. 1 shows the architecture of an electronic processor (hereinafter, referred to as processor for the sake of simplicity) 10.

In particular, the processor 10 is of RISCV type; nevertheless, other types of processors may be similarly considered. By way of example and further description, greater details regarding the ISA ("Instruction Set Architecture") on which the RISCV standard is based, may be found in the document "The RISC-V Instruction Set Manual, Volume I: Base User-Level ISA" by Waterman et al., 2011, Technical Report No. UCB/EECS-2011-62.

FIG. 1 shows, by way of example, only the main components of the processor 10, for example, of RISCV type. However, other components may be present in the processor 10, as evident to the person skilled in the art. For example, greater details regarding the structure of the processor 10 of RISCV type may, for example, be found in the book "Computer Organization and Design RISC-V edition", by David A. Patterson, John L. Hennessy.

The processor 10 is operatively couplable to one or more sensors (not shown and of known type), for example, through an interface module not shown and of known type (e.g., comprising an analog-to-digital converter and a digital-to-analog converter, amplifiers, filters, etc.). In use, the processor receives, from one or more sensors, respective information which is indicative of measurements carried out by the sensors and is optionally pre-processed by the interface module.

In particular, the processor 10 may comprise a clock generator (CG) 24 configured to generate a clock signal CLK and coupled to the other components of the processor 10 in such a way as to provide the clock signal CLK to each of them.

The processor 10 may comprise an instruction register 12 and a load-and-store unit (LSU) 14. The instruction register 12 comprises a multiplicity of memory registers (in detail, each comprising memory elements such as flip-flops) and is operatively couplable to an instruction memory 16 (e.g., a random access memory, RAM) external to the processor 10 and configured to store one or more instruction sequences to be executed by the processor 10 so that the latter performs respective tasks. In detail, the instructions stored in the instruction memory 16 are in machine code and represent the translation into machine language of respective instructions of a code written by a programmer in high-level language (e.g., C, Python, Fortran) to perform the respective task and subsequently translated into machine language through a known-type compiler. The instruction register 12 receives instructions from the instruction memory 16 and stores them so that they are available to be executed by the processor 10, when needed. The LSU 14 comprises a multiplicity of memory registers (in detail, each comprising memory elements such as flip-flops) and is operatively couplable to a sensor data memory 18 (e.g., a RAM) external to the processor 10 and configured to store data, for example, data coming from the one or more sensors. Similarly to the instruction register 12, the LSU 14 receives data from the sensor data memory 18 and stores it so that it is available for the execution of the instructions of the processor 10, when needed.

The processor 10 further comprises a control unit (CU) 20 which is configured to receive instructions from the instruction register 12 and to generate a consequent plurality of electrical signals for controlling the components of the processor 10.

The processor 10 may comprise a program counter (PC) 22 controllable by the CU 20 to select addresses of the instruction memory 16 which contain instructions to be passed to the instruction register 12 so that they are executed by the processor 10 in the next steps.

The processor 10 comprises a register bank (RB, also called "register file") 50, better described hereinbelow. The RB 50 is connected to the instruction register 12 to receive from the latter and store the instructions to be executed by the processor 10. In detail and as better described hereinbelow, the RB 50 is controllable by the CU 20 to store the data corresponding to the instructions coming from the instruction register 12 and to send it, in an orderly manner thanks to the control of the CU 20, to the components of the processor 10 which are to process this data to execute the respective instructions.

The processor 10 may also comprise an immediate generator (IM) 30 connected to the instruction register 12 and configured to decode the constant values to be used during the processing, starting from the instruction which is imported from the instruction memory 16.

By way of example, a first main multiplexer (MUX) 26 and a second main MUX 28 which may be comprised in the processor 10 are also shown (in FIG. 1 they are also indicated with the abbreviations M_P1 and M_P2, respectively); nevertheless, the number of MUXs in this stage may vary on the basis of the design requirements and may, for example, be greater. The main MUXs 26 and 28 each have a plurality of inputs (e.g., 2 for the first main MUX 26 and 4 for the second main MUX 28) and are controlled in use by the CU 20 to transmit at output one of these inputs, selected by the CU 20. An input of each main MUX 26, 28 is connected to a respective output of the RB 50, while the other inputs may be connected to the output of the PC 22 (e.g., for the first main MUX 26), to the output of the IM 30 (e.g., for the second main MUX 28) and to other components of the processor 10. For example, the inputs and the output of each main MUX 26, 28 have 32 bits.

The processor 10 may also comprise an arithmetic-logic unit (ALU) 32 which has inputs each connected to the output of a respective main MUX 26, 28 and which is configured to process the received data in a per se known manner (e.g., through logic and/or arithmetic operations defined by the CU 20 having the ALU 32 connected thereto to be controlled). For example, the ALU 32 operates with 32-bit data.

The processor 10 may also comprise an initialization datum generation module 34 (indicated in FIG. 1 with the abbreviation GEN D_INIT) of a per se known type.

The initialization datum generation module 34 has an input connected to a reference node (in detail, a ground node) GND which has a reference electric potential (for example, equal to 0 V).

In particular, the initialization datum generation module 34 is configured to acquire the reference electric potential and to generate, at an output of the initialization datum generation module 34, a corresponding initialization datum (of digital type, hereinafter also indicated, for the sake of simplicity, D_INIT and, for example, having 32 bits).

In particular, D_INIT is of defined type (with a fixed and known value) and is indicative of the reference electric potential.

In the example considered, D_INIT is formed by 32 bits with value 0 which are defined starting from 0 V of the reference node GND.

In detail, the initialization datum generation module 34 is of known type and, for example, comprises a pull-down network (PDN) of known type and therefore pull-down resistors.

However, other known structures and techniques are usable to generate D_INIT, in a manner per se evident to the person skilled in the art. For example, D_INIT may be stored in the instruction memory 16 and obtained through the instruction register 12.

Figure 2:
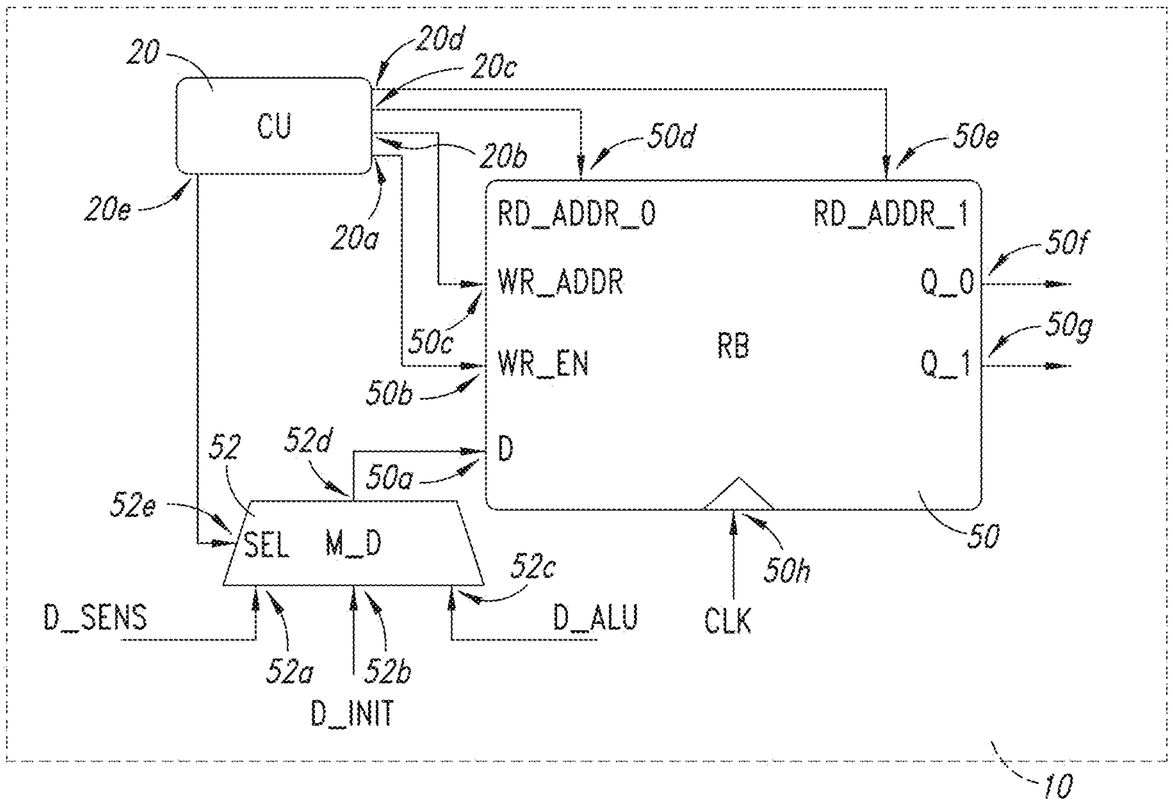
FIG. 2 schematically shows the interconnections of some components of the processor of FIG. 1, according to an embodiment.

Furthermore, the processor 10 comprises an input datum MUX 52 (indicated in FIG. 1 with the abbreviation M_D), which has three inputs and an output and is better shown in FIG. 2. A first input of the input datum MUX 52 is connected to the LSU 14 to receive the data coming from the sensor data memory 18, indicative of the measurements of the one or more sensors. A second input of the input datum MUX 52 is connected to the reference node GND (in particular through the initialization datum generation module 34, whose output is connected to the second input of the input datum MUX 52) to acquire D_INIT. A third input of the input datum MUX 52 is connected to the ALU 32 to receive the output data of the latter. Furthermore, the output of the input datum MUX 52 is connected to a data input of the RB 50. The input datum MUX 52 is controlled by the CU 20 to transmit at output the received datum to one of its inputs, as better described hereinbelow. For example, the inputs and the output of each main MUX 26, 28 have 32 bits.

FIG. 2 shows, in more detail, some components of the processor 10.

In particular, the RB 50 has a write datum input 50*a*, a write enable input 50*b*, a write address input 50*c*, a first read address input 50*d*, a second read address input 50*e*, a first read output 50*f*, a second read output 50*g*, and a clock input 50*h*.

The write datum input 50*a* is connected to the output of the input datum MUX 52 (indicated in FIG. 2 with the reference 52*d*), the write enable input 50*b* is connected to a first output 20*a* of the CU 20, the write address input 50*c* is connected to a second output 20*b* of the CU 20, the first read address input 50*d* is connected to a third output 20*c* of the CU 20, the second read address input 50*e* is connected to a fourth output 20*d* of the CU 20 and the clock input 50*h* is connected to an output of the CG 24. Furthermore, for example, the first read output 50*f* is connected to an input of the first main MUX 26 and the second read output 50*g* is connected to an input of the second main MUX 28.

In use, the write datum input 50*a* receives, from the input datum MUX 52, a write datum (hereinafter also indicated, for the sake of simplicity, D and, for example, having 32 bits), the write enable input 50*b* receives, from the CU 20, a write enable signal (hereinafter also indicated, for the sake of simplicity, WR_EN and, for example, having 1 bit), the write address input 50*c* receives, from the CU 20, a write address signal (hereinafter also indicated, for the sake of simplicity, WR_ADDR and, for example, having 5 bits), the first read address input 50*d* receives, from the CU 20, a first read address signal (hereinafter also indicated, for the sake of simplicity, RD_ADDR_0 and, for example, having 5 bits), the second read address input 50*e* receives, from the CU 20, a second read address signal (hereinafter also indicated, for the sake of simplicity, RD_ADDR_1 and, for example, having 5 bits), the first read output 50*f* sends, to the first main MUX 26, a first read output signal (hereinafter also indicated, for the sake of simplicity, Q_0 and, for example, having 32 bits), the second read output 50*g* sends, to the second main MUX 28, a second read output signal (hereinafter also indicated, for the sake of simplicity, Q_1 and, for example, having 32 bits) and the clock input 50*h* receives, from the CG 24, the clock signal (hereinafter also indicated, for the sake of simplicity, CLK). In greater detail, the input datum MUX 52 generates D, the CU 20 generates WR_EN, WR_ADDR, RD_ADDR_0, RD_ADDR_1 and the CG 24 generates the CLK.

By way of example, the RB 50 is described herein considering the case in which it is capable of providing two outputs in parallel (e.g., it is capable of simultaneously generating two data at output, each on a respective output channel Q_0 and Q_1); nevertheless, the number of outputs of the RB 50 may vary and, for example, be smaller (e.g., 1 single output) or greater (e.g., N>2 outputs), as better described hereinbelow.

As already described, the input datum MUX 52 has the first input (indicated in FIG. 2 with the reference 52*a*), the second input (indicated in FIG. 2 with the reference 52*b*), the third input (indicated in FIG. 2 with the reference 52*c*), the output (indicated in FIG. 2 with the reference 52*d*), and a control input (indicated in FIG. 2 with the reference 52*e*).

The first input 52*a* is connected to the LSU 14, the second input 52*b* is connected to the reference node GND, the third input 52*c* is connected to the ALU 32, the output 52*d* is connected to the write datum input 50*a* of the RB 50 and the control input 52*e* is connected to a fifth output 20*e* of the CU 20.

In use, the first input 52*a* receives, from the LSU 14, a sensor datum (hereinafter also indicated, for the sake of simplicity, D_SENS and, for example, having 32 bits), the second input 52*b* acquires the initialization datum (D_INIT), the third input 52*c* receives, from the ALU 32, an ALU datum (hereinafter also indicated, for the sake of simplicity, D_ALU and, for example, having 32 bits), the output 52*d* sends the RB 50 the write datum (D) and the control input 52*e* receives, from the CU 20, a control signal (hereinafter also indicated, for the sake of simplicity, SEL and, for example, having 2 bits). In greater detail, the LSU 14 generates D_SENS, the reference node GND defines D_INIT, the ALU 32 generates D_ALU, the CU 20 generates SEL and the RB 50 receives D.

For example, D_SENS is indicative of the measurements carried out by the one or more sensors couplable to the processor 10.

Furthermore, SEL is a signal which allows to select which signal at the input of the input datum MUX 52 is to be transmitted at output to the latter. For example, SEL may assume a first value (e.g., '00'), a second value (e.g., '01') or a third value (e.g., '10'); when SEL='00' the first input 52*a* is selected and therefore D=D_SENS, when SEL='01' the second input 52*b* is selected and therefore D=D_INIT, when SEL='10' the third input 52*c* is selected and therefore D=D_ALU.

In particular and as better described below with reference to FIG. 3, the RB 50 comprises a plurality $K_1$ of registers (in particular each comprising a plurality $K_2$ of memory elements, for example, flip-flops). In detail, the registers and the memory elements are of the without-reset type. In the example considered, $K_2$=32 so that each register may store a 32-bit datum.

The RB 50 may operate selectively, at each instant, in an initialization (or reset) mode or in a write mode. Furthermore, at each instant the RB 50 may also operate in read mode, simultaneously or not with the write/initialization mode.

In particular, in the initialization mode each of these memory elements of the registers may be initialized to a defined and default value (a reset value, e.g., '0') controlling the input datum MUX 52 in such a way that D=D_INIT (where D_INIT is a $K_2$-bit datum, wherein each of these bits is stored in a respective memory element of the register and is equal to the reset value, e.g., '0') and simultaneously selecting the initialization mode of the RB 50 (this occurs when WR_EN assumes a first value, e.g., '1') and providing a register address which identifies, from among the registers present in the RB 50, the specific register to be initialized (this occurs when WR_ADDR assumes a value corresponding to the address in the RB 50 of the register to be initialized).

In write mode (optional), each register may be overwritten (e.g., the bit of each memory element of the register may pass from '0' to '1' and vice versa) controlling the input datum MUX 52 in such a way that D=D_SENS or D=D_ALU (depending on whether it is desired to write in the register the datum coming from the LSU 14 or, respectively, from the ALU 32) and simultaneously selecting the write mode of the RB 50 (this occurs when WR_EN assumes the first value, e.g., '1') and providing a register address which identifies, from among the registers present in the RB 50, the specific register to be overwritten (this occurs when WR_ADDR assumes a value corresponding to the address in the RB 50 of the register to be overwritten).

In the read mode (optional), each register may be read (the bits saved in the memory elements may be provided at output to the RB 50) providing the register addresses which identify, from among the registers present in the RB 50, the specific registers to be read in the read outputs 50*f* and 50*g* (this occurs when RD_ADDR_0 and RD_ADDR_1 each assume a value corresponding to the address in the RB 50 of the registers to be read, in such a way as to provide at output as first and, respectively, second read output signal Q_0 and Q_1 the data saved in the respective registers identified by RD_ADDR_0 and RD_ADDR_1).

As evident, the initialization mode and the write mode are similar and differ only for the datum to be written in the register (the sequence of reset values for the initialization mode and the datum D_SENS or D_ALU for the write mode). In other words, both the initialization mode and the write mode may be considered as comprised in an update mode of the RB 50, identified by WR_EN='1' (common to both the initialization mode and the write mode and identifying the enabling of the update of the RB 50). Consequently, the without-reset memory elements of the RB 50 may be initialized in a manner similar to that commonly used to write therein. This facilitates the correct functioning of the RB 50 and therefore of the processor 10 without the need to have a reset line for each memory element of the RB 50 (an additional input for each memory element, configured to receive a reset signal when the memory elements are to be initialized). The update mode of the RB 50 is instead disabled when WR_EN assumes a second value (e.g., WR_EN='0' identifying the disabling of the update of the RB 50); in this case, the RB 50 can neither be initialized nor overwritten.

Figure 3:
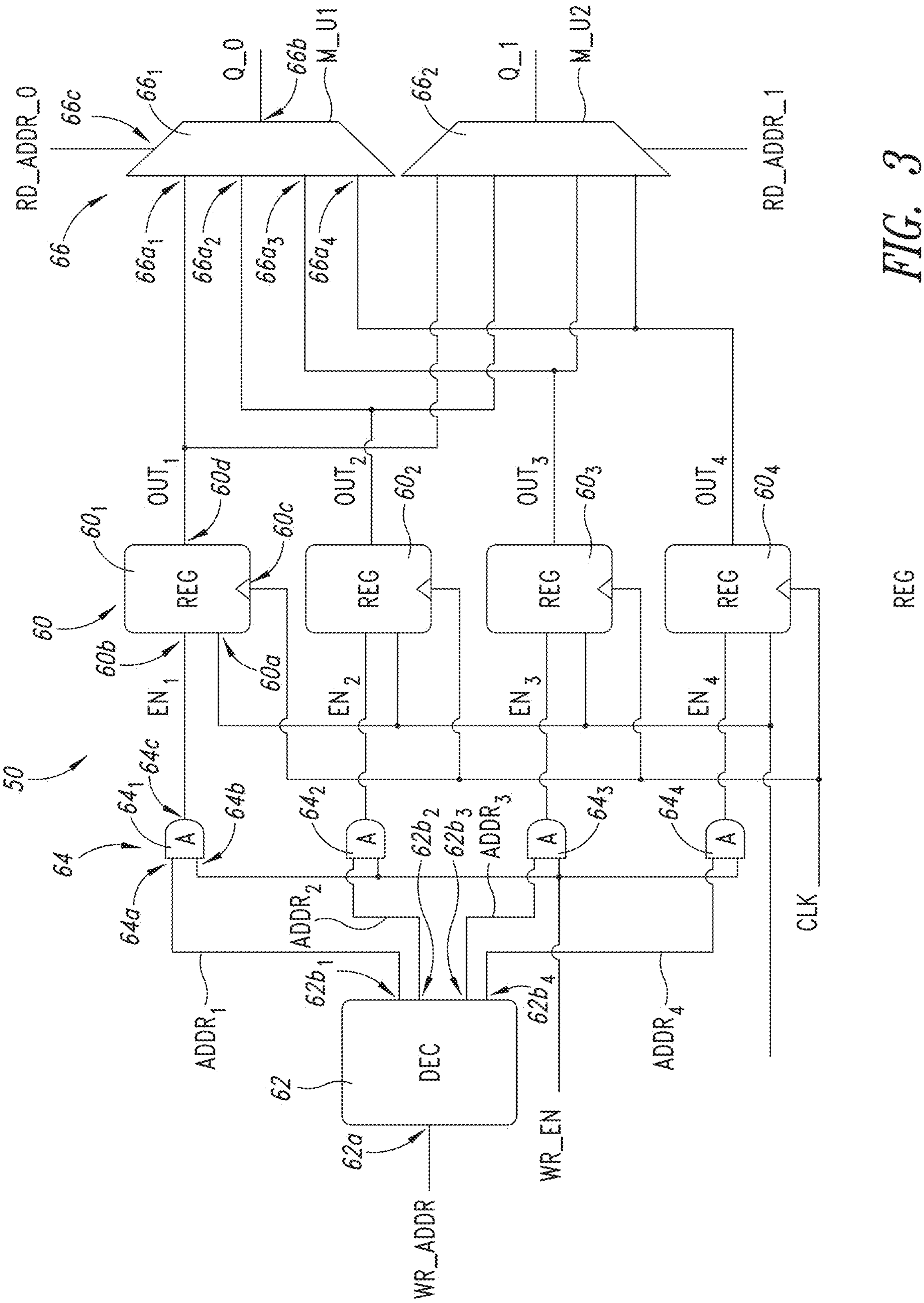
FIG. 3 schematically shows the structure of a register bank of the processor of FIG. 1, according to an embodiment.

FIG. 3 shows the structure of the RB 50 in greater detail, according to one embodiment.

As already mentioned, the RB 50 comprises $K_1$ registers, here indicated as a whole with the reference 60. In the embodiment of FIG. 3 $K_1$=4 is exemplarily considered (a first, a second, a third and a fourth register 60$_1$-60$_4$), not to unnecessarily obscure the description and understanding of the RB 50. Nevertheless, a different value of $K_1$ may be similarly considered (e.g., $K_1$>4); for example, the RB 50 may comprise 32 registers 60. Furthermore, each register 60 may store a $K_2$-bit datum and therefore, in the example considered, a 32-bit datum.

In detail, each register 60$_i$ (with $1 \le i \le 4$) comprises a respective write datum input 60*a*, a respective write enable input 60*b*, a respective clock input 60*c* and a respective output 60*d*.

The RB 50 further comprises a decoder (with abbreviation DEC in FIG. 3) 62 having an input 62*a* and $K_1$ outputs (here called first to fourth output and indicated with the respective references 62*b*$_1$-62*b*$_4$). In other words, the decoder 62 is of 1:$K_1$ type and has an output 62*b*, for each register 60. In detail, the input 62*a* of the decoder 62 coincides with (forms and defines) the write address input 50*c* of the RB 50 and therefore is connected to the CU 20 to receive WR_ADDR.

The RB 50 also comprises $K_1$ main AND logic gates, indicated as a whole with the reference 64 and with the abbreviation A. In other words, there are present a first to a fourth main AND logic gate 64*i* (with 1≤i≤4), one for each register 60, as illustrated $\mathbf{64}_1$, $\mathbf{64}_2$, $\mathbf{64}_3$ and $\mathbf{64}_4$.

Each main AND logic gate $\mathbf{64}_i$ is of AND type and has a first input 64*a*, a second input 64*b* and an output 64*c*, respectively. In each main AND logic gate $\mathbf{64}_i$ the first input 64*a* is connected to the i-th output $\mathbf{62}b_i$, of the decoder 62, the second input 64*b* coincides with the write enable input 50*b* of the RB 50 and therefore is connected to the CU 20 to receive WR_EN and the output 64*c* is connected to the write enable input 60*b* of the i-th register $\mathbf{60}_i$.

In each register $\mathbf{60}_i$ (abbreviation REG in FIG. 3), the write datum input 60*a* coincides with the write datum input 50*a* of the RB 50 and therefore is connected to the input datum MUX 52 to receive 32-bit D. Furthermore, the write enable input 60*b* is connected to the output 64*c* of the i-th main AND logic gate $\mathbf{64}_i$ and the clock input 60*c* coincides with the clock input 50*h* of the RB 50 and therefore is connected to the CG 24 to receive CLK.

The RB 50 further comprises an output MUX for each output of the RB 50. In other words, in the embodiment of FIGS. 2 and 3, the RB 50 comprises a first output MUX $\mathbf{66}_1$ (abbreviation M_U1 in FIG. 3) and a second output MUX $\mathbf{66}_2$ (abbreviation M_U2 in FIG. 3).

Each output MUX 66 is of $K_i$:1 type, comprises respectively $K_1$ inputs (one for each register 60, indicated in FIG. 3 with the references $\mathbf{66}a_1$-$\mathbf{66}a_4$) and an output 66*b*. In detail, each input $\mathbf{66}a_i$ of the output MUX 66 considered is connected to the output 60*d* of the i-th register $\mathbf{60}_i$, while the output 66*b* of the j-th output MUX $\mathbf{66}_j$ (with 1≤j≤2) coincides with the j-th read output 50*f*, 50*g* of the RB 50 and therefore generates in use Q_0 for the first output MUX $\mathbf{66}_1$ and Q_1 for the second output MUX $\mathbf{66}_2$. In the example considered, the inputs $\mathbf{66}a_1$-$\mathbf{66}a_4$ and the output 66*b* have 32 bits. Furthermore, each output MUX 66 comprises a respective control input 66*c* through which the CU 20 controls in use the output MUX 66; in detail, the control input 66*c* of the first output MUX $\mathbf{66}_1$ coincides with the first read address input 50*d* of the RB 50 and therefore is connected to the CU 20 to receive RD_ADDR_0, and the control input 66*c* of the second output MUX $\mathbf{66}_2$ coincides with the second read address input 50*e* of the RB 50 and therefore is connected to the CU 20 to receive RD_ADDR_1.

Figure 4:
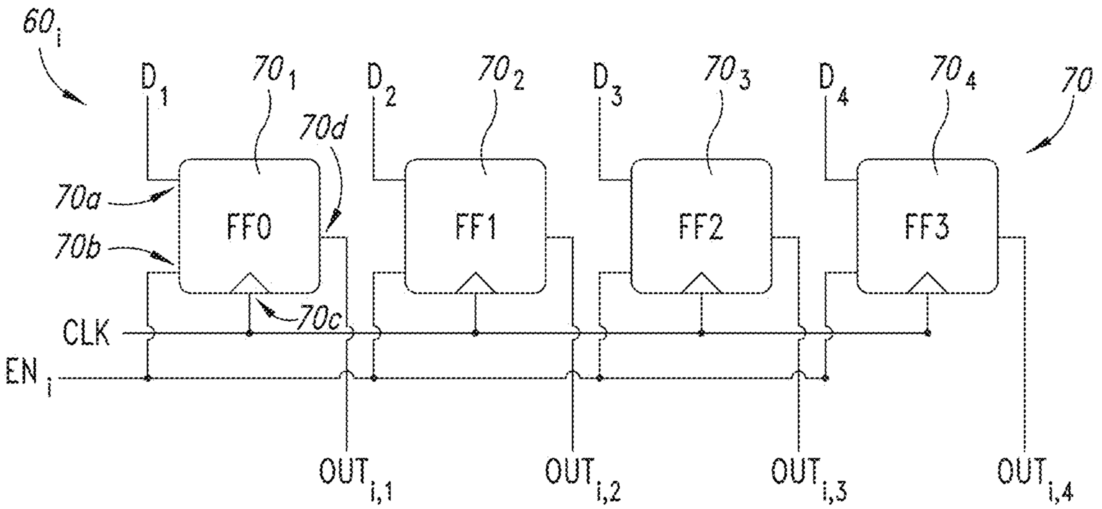
FIG. 4 schematically shows the structure of a register of the register bank of FIG. 3, according to an embodiment.

FIG. 4 shows the structure of one of the registers 60 in greater detail.

In particular, each register 60 comprises $K_2$ memory elements, one for each bit of the datum to be stored in the register 60. The memory elements are indicated as a whole with the reference 70. By way of example and not to excessively obscure the understanding, FIG. 4 shows 4 memory elements (a first to a fourth memory element $\mathbf{70}_1$-$\mathbf{70}_4$, indicated in FIG. 4 respectively with the abbreviations FF0-FF3); nevertheless, the number $K_2$ may be different from 4 and for example, in the example considered wherein the data in the registers is 32-bit data, $K_2$=32.

In detail, the memory elements 70 are of without-reset type (they do not have an initialization input for receiving a reset signal) and may each store a 1-bit information. In fact, the registers 60 of the without-reset type are defined as registers comprising memory elements 70 of without-reset type.

In detail, the memory elements 70 are flip-flops of without-reset type (so-called without-reset flip-flops), for example, known without-reset D flip-flops. For illustrative and non-limiting purposes, the book "CMOS VLSI Design: A Circuits and System Perspective" describes, in section 10.3.2, a possible example of without-reset flip-flop (e.g., FIG. 10.19); however, other known without-reset flip-flop structures are usable.

In greater detail, each memory element 70*k* (with 1≤k≤4) has a write datum input 70*a*, an enable input 70*b*, a clock input 70*c* and a read output 70*d*.

In particular, the write datum inputs 70*a* form the write datum input 60*a* of the register $\mathbf{60}_i$, and are therefore configured to receive D. In greater detail, in use each memory element $\mathbf{70}_k$ receives an elementary datum $D_k$ of D (the bit $D_k$ of D) in such a way that the succession of $K_2$ bits of D is stored simultaneously, bit by bit, in the $K_2$ memory elements $\mathbf{70}_k$, in a per se known manner. Furthermore, the enable inputs 70*b* form the write enable input 60*b* of the register $\mathbf{60}_i$ and are therefore connected to the main AND logic gate $\mathbf{64}_i$. The clock inputs 70*c* form the clock input 60*c* of the register $\mathbf{60}_i$ and are therefore connected to the CG 24. The read outputs 70*d* form the output of the register $\mathbf{60}_i$ and are configured to transmit the information saved in the memory elements $\mathbf{70}_k$. This information output from the register $\mathbf{60}_i$ is called hereinbelow output signal (hereinafter also indicated, for the sake of simplicity, $OUT_i$). $OUT_i$ has $K_2$ bits, one for each memory element $\mathbf{70}_k$. In detail, the read output 70*d* of each memory element $\mathbf{70}_k$ generates at output an elementary datum $OUT_{i,k}$ of $OUT_i$ (the bit $OUT_{i,k}$ of $OUT_i$) in such a way that the succession of $K_2$ bits of $OUT_i$ is provided at output from the register $\mathbf{60}_i$ simultaneously, bit by bit, by the $K_2$ memory elements $\mathbf{70}_k$, in a per se known manner.

In use, the CU 20, the input datum MUX 52 and the RB 50 function as now described.

At each clock pulse of CLK, the CU 20 generates SEL, WR_EN, WR_ADDR, RD_ADDR_0, RD_ADDR_1, Q_0 and Q_1 on the basis of the finite-state machine (FSM) shown in FIG. 5 and better described below.

At each clock pulse of CLK, the input datum MUX 52 selects D from among D_SENS, D_INIT and D_ALU on the basis of SEL. For example, if SEL='00' D=D_SENS, if SEL='01' D=D_INIT and if SEL='10' D=D_ALU.

At each clock pulse of CLK, the decoder 62 receives WR_ADDR at input and decodes it, in a per se known manner, to generate at output $K_1$ address signals $ADDR_i$ (a first to a fourth address signal $ADDR_1$-$ADDR_4$), one for each register $\mathbf{60}_i$. For example, $ADDR_i$ has 1 bit like WR_EN. $ADDR_i$ assumes a first value (e.g., '0') when WR_ADDR is not indicative of the initialization of the i-th register $\mathbf{60}_i$, and assumes a second value (e.g., '1') when WR_ADDR is indicative of the initialization of the i-th register $\mathbf{60}_i$.

For example, when WR_ADDR is indicative of the initialization of the third register $\mathbf{60}_3$, $ADDR_i$='0', $ADDR_2$='0', $ADDR_3$='1', $ADDR_4$='0'.

Each main AND logic gate $\mathbf{64}_i$ receives at input $ADDR_i$ and WR_EN and generates at output an enable signal $EN_i$ which assumes a first value (e.g., '0') if $ADDR_i$='0' and/or WR_EN='0' and assumes a second value (e.g., '1') if $ADDR_i$='1' and WR_EN='1'. In other words, $EN_i$='1' only if the method is in write/initialization mode (WR_EN='1') and if the i-th register $\mathbf{60}_i$ has been selected for writing/initialization.

Each register $\mathbf{60}_i$ receives at input $EN_i$, D and CLK and generates at output $OUT_i$. In detail, each memory element $\mathbf{70}_k$ receives at input $EN_i$, $D_k$ and CLK and generates at output $OUT_{i,k}$. In particular, if $EN_i$'1' the register $\mathbf{60}_i$ is to be updated at the current clock pulse, therefore each memory element $\mathbf{70}_k$ of the register $\mathbf{60}_i$ stores $D_k$; if instead $EN_i$='0' the register $\mathbf{60}_i$ is not to be updated at the current clock pulse, therefore each memory element $70_k$ of the register $60_i$ keeps in memory the value $D_k$ previously stored and does not update it on the basis of the last D received. Furthermore, each memory element $70_k$ of the register $60_i$ generates at output the stored value $OUT_{i,k}$ so that $OUT_i$ is generated at output by the register $60_i$.

Each output MUX $66_j$ receives at input RD_ADDR_j and the $OUT_i$s of all the registers $60_i$ and generates at output Q_j. In particular, Q_j is equal to the $OUT_i$ of the register $60_i$ selected through RD_ADDR_j. For example, if RD_ADDR_j identifies the second register $60_2$ and RD_ADDR_j identifies the third register $60_3$, Q_0=$OUT_2$ and Q_1=$OUT_3$.

Figure 5:
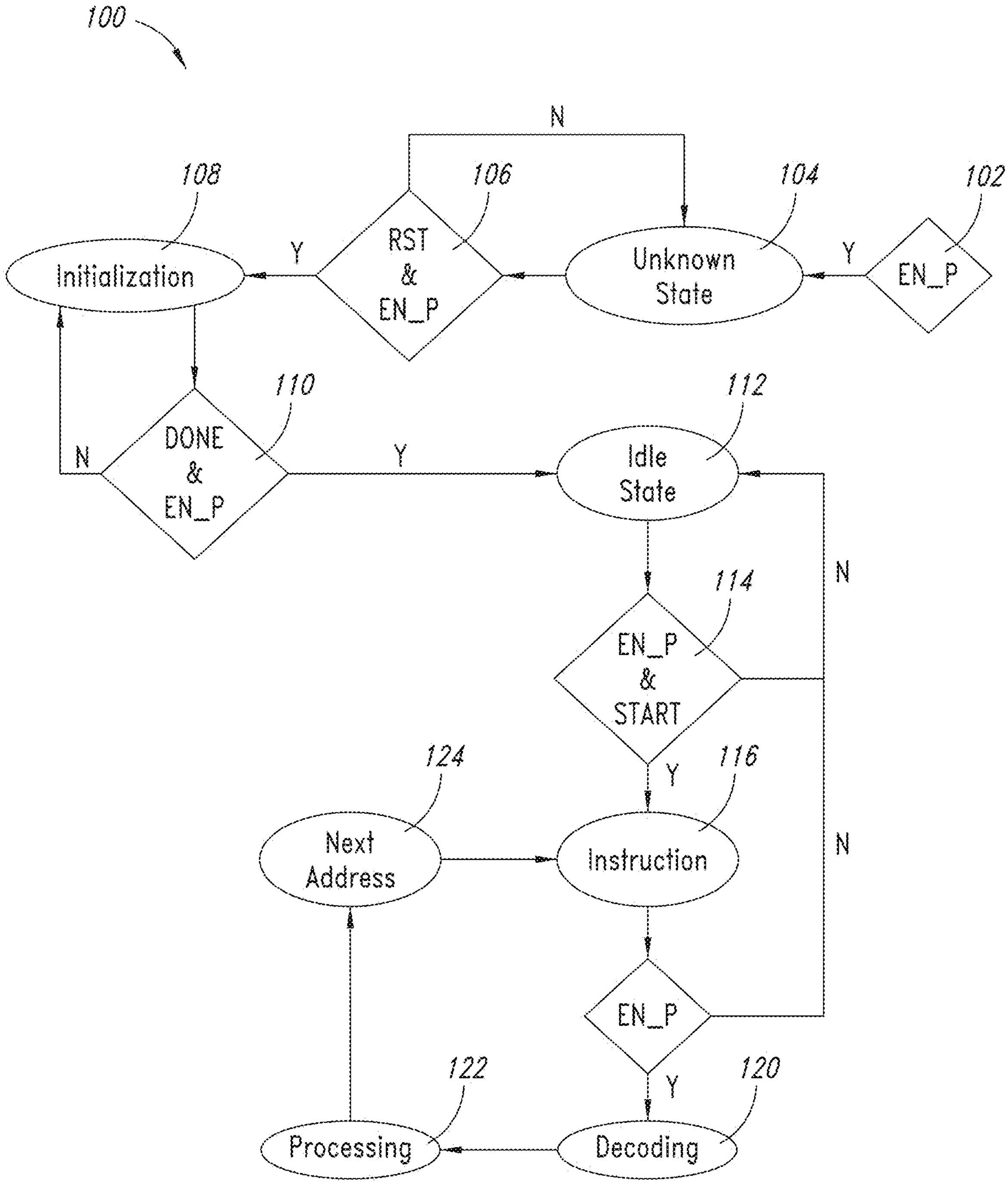
FIG. 5 is a block diagram illustrating a state machine implemented by the processor of FIG. 1, according to an embodiment.

FIG. 5 shows the implemented FSM in use by the CU 20 to manage the functioning of the processor 10. In particular, the FSM is indicated in FIG. 5 with the reference 100 and corresponds to a control method of the processor 10 implemented through the CU 20. In particular, the control method comprises an initialization method of the RB 50, corresponding to the initialization mode previously described.

Initially (passing condition 102), the CU 20 activates upon receiving a processor activation signal (EN_P). For example, EN_P is a fetch enable signal which is absent when the processor 10 is off and may be provided from the outside, for example, may be provided manually by an operator who turns on an electronic apparatus which comprises the processor 10.

Upon receiving EN_P, the processor 10 passes to an unknown state 104, by default, and remains there until the CU 20 receives (passing condition 106) a reset signal (RST) in addition to EN_P. RST is provided to the CU 20 when the initialization of the processor 10 and therefore the reset of the RB 50 is requested, so that the processor 10 is ready to operate correctly. Consequently, RST is indicative of an initialization request of the registers 60.

When the CU 20 receives RST, the processor 10 passes to an initialization state 108 wherein the RB 50 is initialized. This state coincides with the initialization mode of the RB 50 and defines the initialization method of the RB 50.

In the initialization state 108, the CU 20 controls the sequential initialization of all registers 60. In other words, the CU 20 generates WR_EN='1' and SEL='10' for $K_1$ clock pulses (initialization period) and, at each clock pulse, generates the WR_ADDR corresponding to a respective register $60_i$. In this manner, at each clock pulse a respective register $60_i$ is initialized to D_INIT and, at the end of the $K_1$ clock pulses, all registers 60 of RB 50 are initialized.

After the initialization of all registers 60 is completed, the CU generates (passing condition 110) an initialization completed signal (DONE) indicative of the completion of the initialization of the registers 60 of the RB 50.

As long as DONE is not generated, the processor 10 remains in the initialization state 108. Upon generating DONE, the processor 10 passes to an idle state 112 wherein the processor 10 is ready to operate.

The processor 10 remains in the idle state 112 as long as (passing condition 114) the CU 20 receives an operation start signal (START) in addition to EN_P. START is indicative of a start of execution of the operations of the processor 10, of execution of the instructions present in the instruction register 12.

When the CU 20 receives START, the processor 10 fetches (step 116) an instruction present in the instruction memory 16 and saves it in the instruction register 12, checks (passing condition 118) that EN_P is always present, decodes (step 120) the fetched instruction, processes (step 122) the instruction (executes it, for example, the ALU 32 performs the requested operation established by the instruction), acquires (step 124) the address of the successive instruction to be fetched from the instruction memory 16 and repeats steps 116-124 with the new instruction to be executed. Examples of these instructions to be executed are reading and overwriting one or more registers 60 of the RB 50.

Steps 114-124 are performed in a per se known manner and therefore are not described herein in detail. In general, steps 114-124 define an operation execution state of the processor 10.

The repetition of steps 116-124 allows the instructions present in the instruction register 12 to be executed and therefore allows the task required to the processor 10, previously initialized at step 108, to be completed.

For example, RST, DONE and START are flags that are generated upon reaching the respective conditions. Otherwise, they are signals that assume a first value (e.g., '0') by default and pass to a second value (e.g., '1') upon reaching the respective conditions.

Figures 6A, 6B, 6C, 6D, 6E:
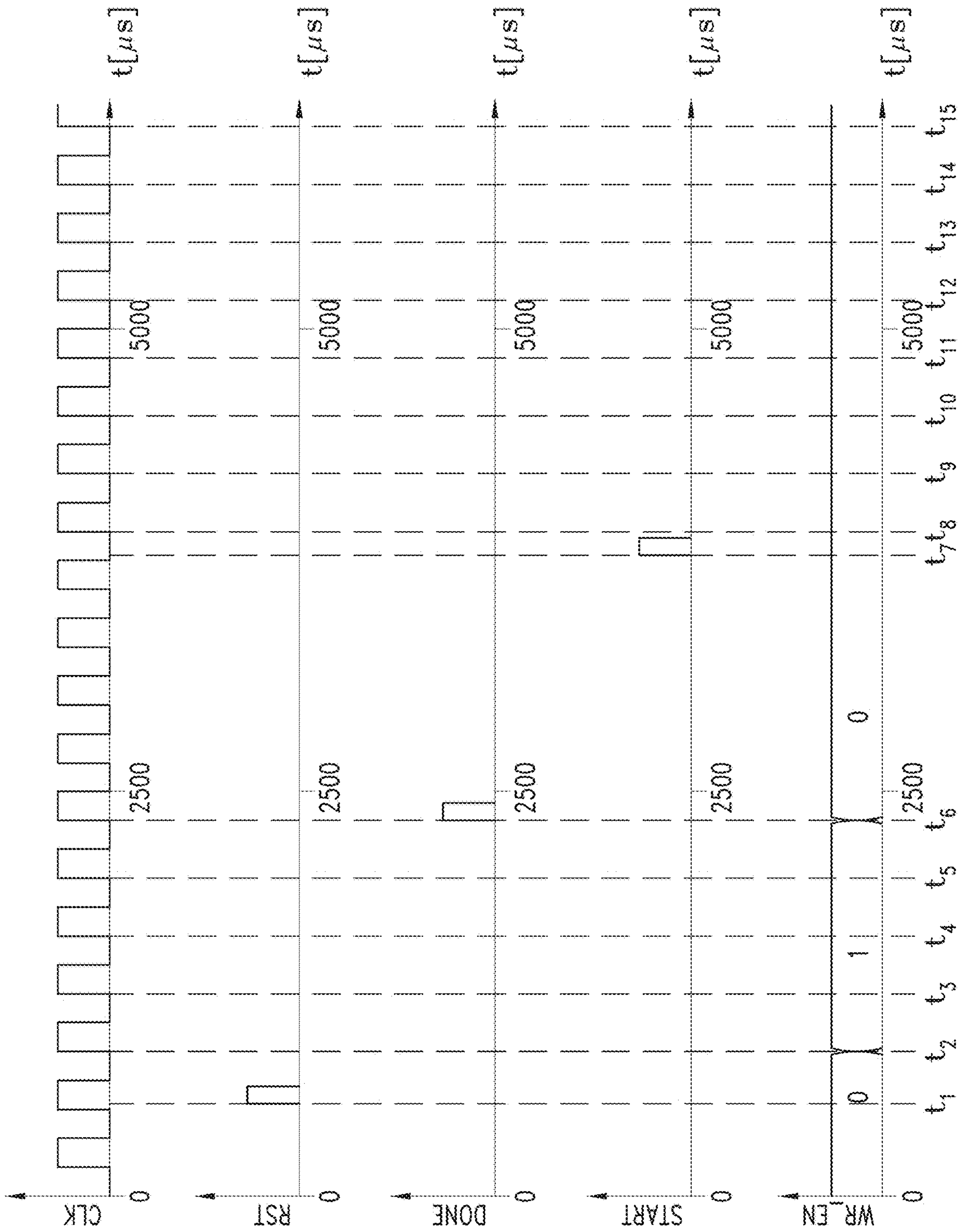
FIGS. 6A-6O show, as time varies, electrical signals generated or received by the processor 10
Figure 6F:
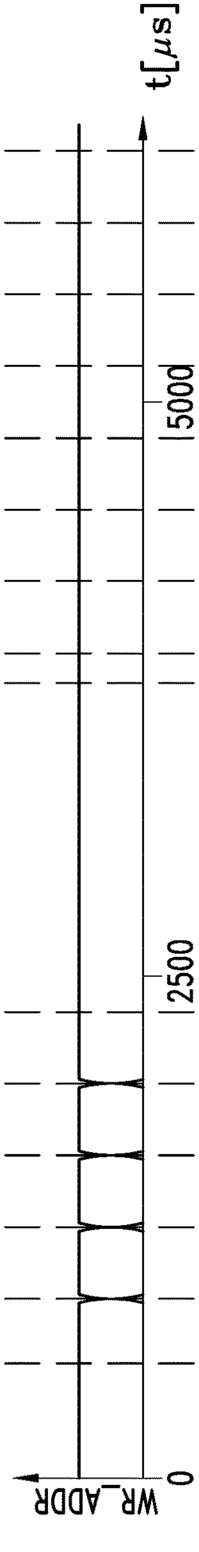
FIG. 6P shows the alternation over time of the states of the state machine of FIG. 5, according to an embodiment.
Figure 6G:
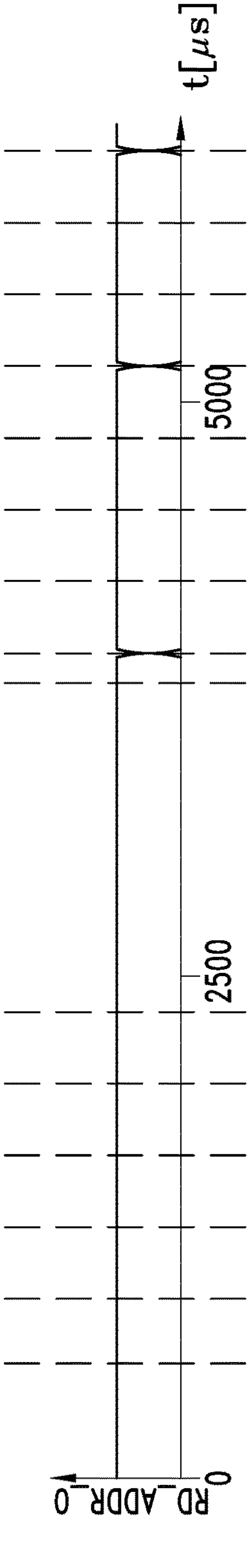
Figure 6H:
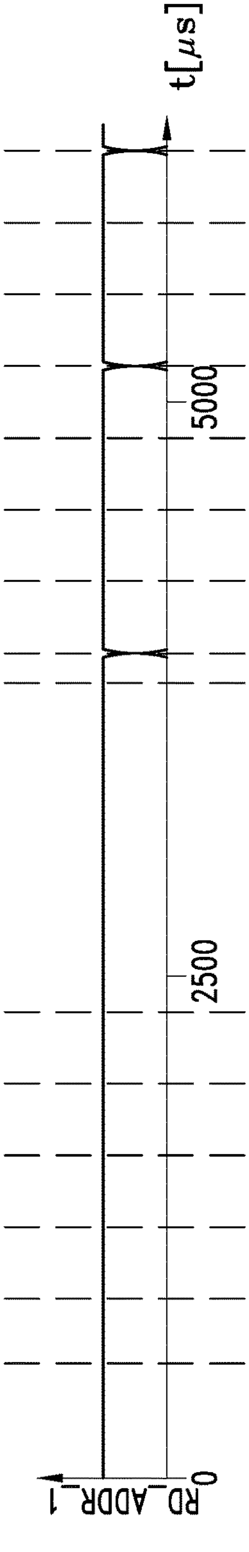
Figure 6I:
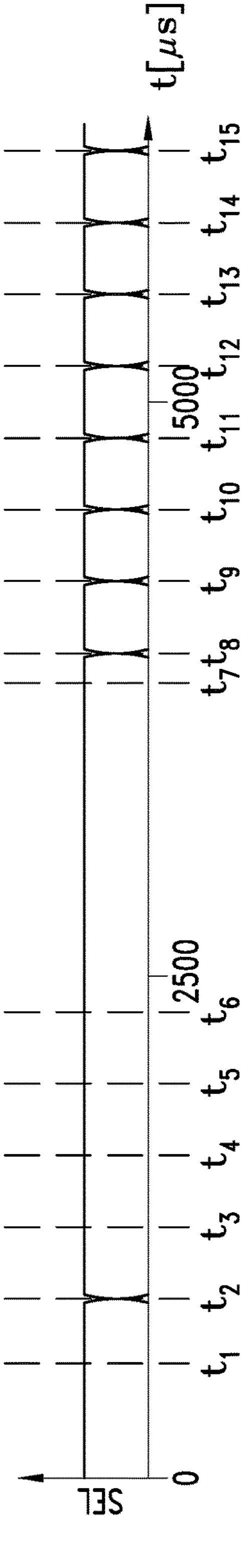
Figures 6J, 6K, 6L:
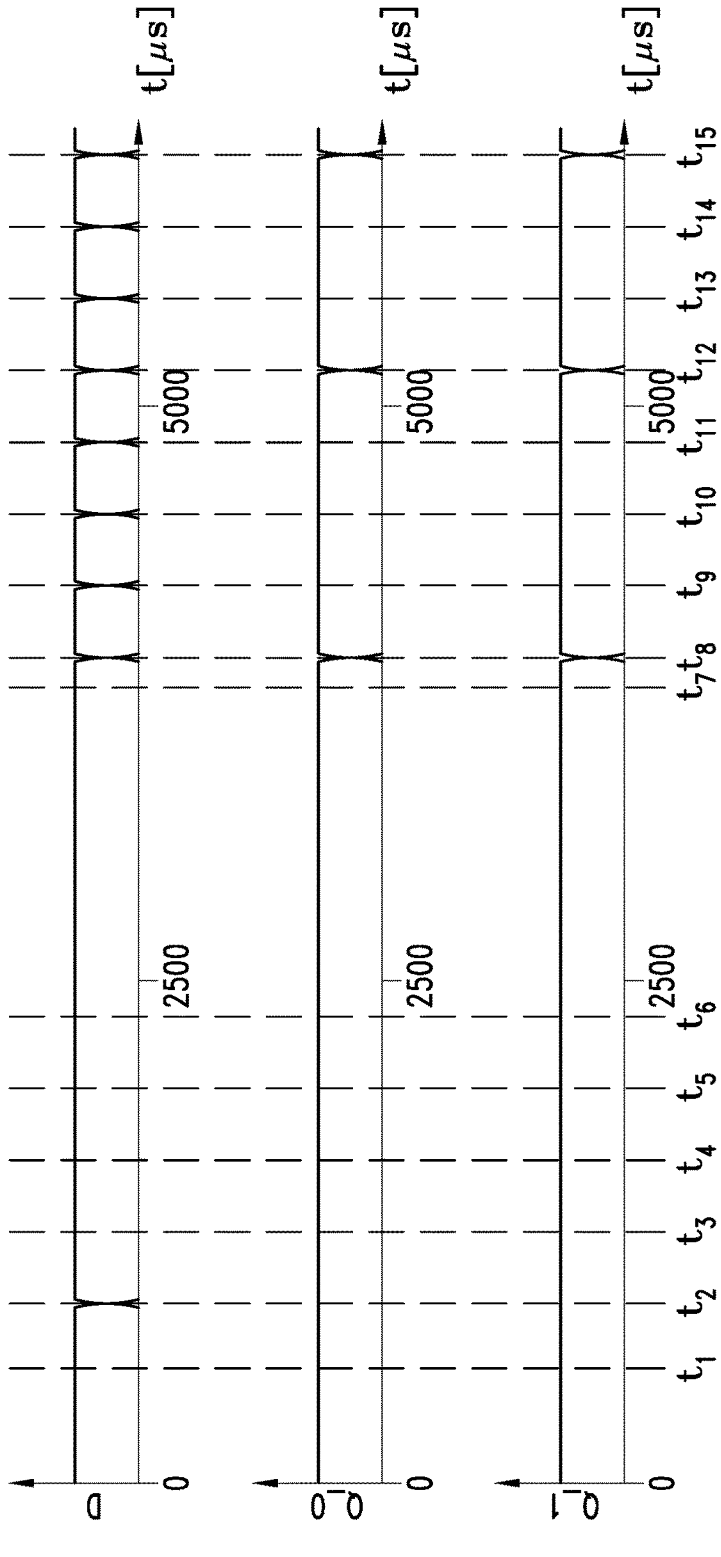
Figures 6M, 6N, 6O, 6P:
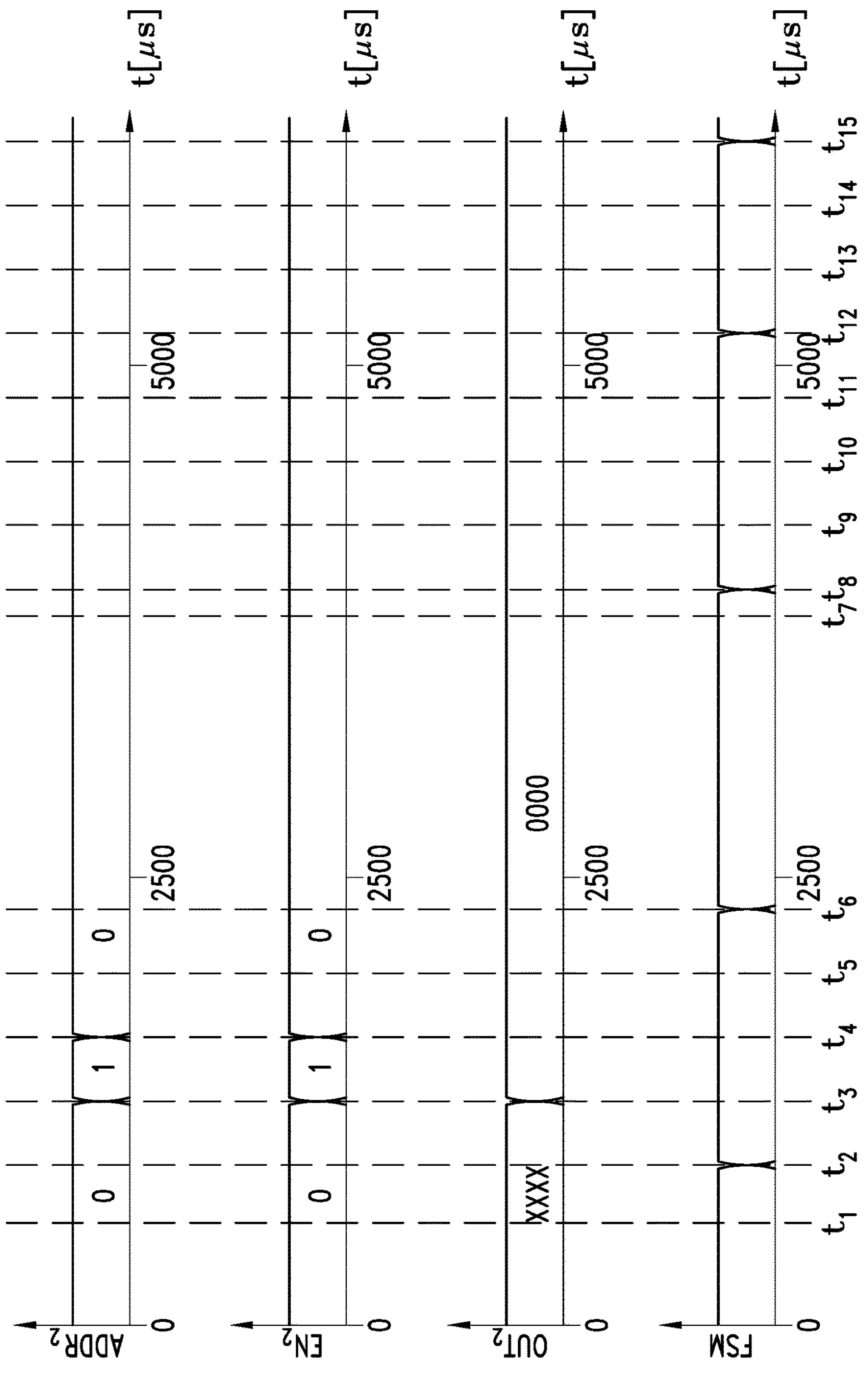

FIGS. 6A-6P show the waveforms of the previously described signals.

In particular, FIGS. 6A-6O show respectively: CLK, RST, DONE, START, WR_EN, WR_ADDR, RD_ADDR_0, RD_ADDR_1, SEL, D, Q_0, Q_1, $ADDR_2$, $EN_2$, $OUT_2$. $ADDR_2$, $EN_2$, $OUT_2$ are shown to illustrate the initialization of the second register $60_2$ of the RB 50, by way of example and generalizable to any other register 60. Furthermore, FIG. 6P shows the alternation of the states of the FSM of FIG. 5. By way of example EN_P, which is supposed to be present throughout the duration of the operations of the processor 10 (e.g., EN_P='1' from $t_0$ onwards), is not shown.

From FIGS. 6A-6P it may be seen that RST is present at instant $t_1$.

Up to $t_2$ (at the first clock pulse immediately successive to $t_1$, for example, considered on the rising edge of CLK), WR_EN='0' and the FSM is in the unknown state 104.

At $t_2$ and for the successive $K_1$ clock pulses, WR_EN passes to '1' (initialization mode), SEL passes from any value to '10' (D=D_INIT) and WR_ADDR assumes, at each clock pulse, a value indicative of a respective address of the register 60 of the RB 50 to be initialized. In detail, at $t_2$ WR_ADDR is indicative of the first register $60_1$, at $t_3$ WR_ADDR is indicative of the second register $60_2$, at $t_4$ WR_ADDR is indicative of the third register $60_3$, at $t_5$ WR_ADDR is indicative of the fourth register $60_4$. Consequently, in the $K_1$ clock pulses successive to $t_2$ (in $t_2 \le t \le t_6$) the registers 60 are initialized to D_INIT. At $t_6$ WR_EN returns to '0' and DONE is generated. Consequently, in $t_2 \le t \le t_2$ the FSM is in the initialization state 108.

In particular, referring to the exemplary case of the second register $60_2$, $ADDR_2$ passes from '0' to '1' at $t_3$ (at the second clock pulse after $t_2$) to return then to '0' at $t_4$, and similar behavior may be seen in $EN_2$. At $t_3$ therefore, D_INIT is stored in the second register $60_2$ and $OUT_2$ passes from an undefined value (e.g., XXXX considering a 4-bit register 60) to D_INIT (e.g., 0000 considering a 4-bit register 60).

At $t_7$ START is received, therefore in $t_6 \le t \le t_8$ (where $t_8$ is the first clock pulse immediately successive to $t_7$, for example, considered on the rising edge of CLK) the FSM is in the idle state 112.

At $t_8$ the FSM passes in states 116-124 (one state for each clock pulse successive to $t_8$). Consequently, the execution of the first instruction lasts from $t_8$ to $t_{12}$ and states 116-124 are repeated every 4 clock pulses until the end of the instructions saved in the instruction register 12.

In particular, at $t_8$ RD_ADD_0 and RD_ADD_1 pass from respective undefined values to values indicating the addresses of the respective registers 60 whose value in Q_0 and Q_1 is desired to be read (which is done at $t_8$, as may be seen). Furthermore, SEL is generated by the CU 20 at each clock pulse as a function of the current instruction to be executed and, consequently, D varies accordingly.

Consequently, the procedure for initializing the registers 60 performed in $t_2 \le t \le t_6$ generates a latency equal to $K_1$ clock pulses but allows the registers 60 to be initialized without the need to send the reset signal to each memory element. This allows the correct and normal use of the processor 10 at $t \ge t_8$.

From an examination of the characteristics of the disclosure made according to the present disclosure, the advantages that it facilitates are evident.

In particular, the register bank 50 allows a significant reduction in terms of silicon area necessary for the processor 10, without compromising the performances of the latter. For example, considering a RISCV processor with single-stage ISA RV32I and with H9A-type tech node, with the same performances, the area savings of the present register bank 50 and of the processor 10 thereof are about 10% relative to the case of a known-type register bank, with a decrease of logic gates equal to about 1 Kgate. This entails a substantial saving in terms of area occupation of the register bank 50, overall cost and power consumption of the processor 10. Furthermore, this entails a better reliability of the processor 10 since the risk of congestion of the electrical signals generated by the processor 10 decreases.

These advantages are made possible thanks to the use of memory elements 70 of the registers 60 (in particular, flip-flops) of without-reset type. In fact, considering that normally a with-reset flip-flop comprises 24 transistors while a without-reset one comprises 20 transistors, using without-reset flip-flops allows the area occupation to be reduced by about 16.67% for each flip-flop. Considering then that the register bank 50 generally comprises 32×32 flip-flops, it is understood how the overall reduction of the area occupied by the present register bank 50 relative to a known-type one is significant.

Although the memory elements 70 are without reset, they maintain the possibility of being initialized by the previously described initialization mode, in synchronous logic, unchanged. In other words, the initialization mode allows the registers 60 internal to the register bank to be initialized so that they function correctly when the processor 10 executes the instructions whereto it is appointed.

The initialization procedure is repeated whenever RST is applied to the entire processor 10. Since this rarely occurs during use of the processor 10, the initial latency due to the initialization of the registers 60 is completely negligible with respect to the period in which the processor 10 may operate following the initialization of the registers 60. For example, considering a register bank 50 with 32 registers and a CLK frequency equal to about 10 MHz, the latency for the initialization of the registers 60 is approximately equal to 3.5 μs and the average duration of execution of a program by the processor 10 is about 2 seconds; consequently, the impact of the initialization latency on the average duration of execution of the program is about $10^{-3}$, substantially null.

Furthermore, the possibility of initializing the registers 60 in write mode (already provided in common register banks) allows the number of structural and design modifications to be applied to the register bank 50 to be limited, allowing an already present functionality to be used in a new manner.

Finally, it is clear that modifications and variations may be made to the disclosure described and illustrated herein without thereby departing from the scope of the present disclosure. For example, the different embodiments described may be combined with each other so as to provide further solutions.

Furthermore, the input datum MUX 52 may, more generally, choose between D_INIT and at least one further input operating datum (e.g., D_SENS or D_ALU). In other words, the input datum MUX 52 may have two or more inputs (among which the input for D_INIT is present) and may be configured to transmit D_INIT or a further datum at output. For example, the input datum MUX 52 may have M>3 inputs and SEL may assume M values in such a way that the output 52*d* may generate D_INIT or a different datum chosen from among the M−1 remaining data received at the input of the input datum MUX 52.

The RB 50 may have a different number of outputs, and therefore generate a single read output signal (e.g., Q_0) or more than two read output signals, through a respective number of output MUXs 66.

Furthermore, $K_1$ and $K_2$ may be different with respect to what has been previously described and, for example, equal to 32. This may be accomplished through obvious modifications on the basis of what has been previously described. For example, the RB 50 comprises in this case 32 outputs of the decoder 62, 32 main AND logic gates 64, 32 registers 60 (each comprising 32 without-reset flip-flops).

A register bank (50) for an electronic processor (10) may be summarized as including a first plurality of registers (60), wherein the register bank (50) has a write datum input (50*a*), a write enable input (50*b*) and a write address input (50*c*), wherein the write datum input (50*a*) is configured to receive an initialization datum (D_INIT) of predefined type, the write enable input (50*b*) is configured to receive a write enable signal (WR_EN) and the write address input (50*c*) is configured to receive a write address signal (WR_ADDR), wherein the register bank (50) is selectively controllable in an initialization mode and in a write mode of at least one register (60) of the first plurality of registers (60), wherein the register bank (50) is configured to, in the initialization mode of the at least one register (60) of the first plurality of registers (60): receive, in the initialization mode, the initialization datum (D_INIT); receive, in the initialization mode, the write enable signal (WR_EN) identifying the enabling of the update of the at least one register (60) to be initialized; receive, in the initialization mode, the write address signal (WR_ADDR) identifying an address of the at least one register (60) to be initialized; and in response to receiving the write enable signal (WR_EN), store the initialization datum (D_INIT) in the at least one register (60) to be initialized.

The registers (60) may be of without-reset type.

The write datum input (50*a*) may be further configured to receive an operating datum (D_SENS; D_ALU), wherein the register bank (50) is configured to, in a write mode of at least one register (60) of the first plurality of registers (60): receive, in the write mode, the operating datum (D_SENS; D_ALU); receive, in the write mode, the write enable signal (WR_EN) identifying the enabling of the update of the at least one register (60) to be overwritten; receive, in the write mode, the write address signal (WR_ADDR) identifying the address of the at least one register (60) to be overwritten; and in response to receiving the write enable signal (WR_EN), store the operating datum (D_SENS; D_ALU) in the at least one register (60) to be overwritten.

The register bank (50) may further have at least one first read address input (50*d*) and at least one first read output (50*f*), wherein the first read address input (50*d*) is configured to receive a first read address signal (RD_ADDR_0) and the first read output (50*f*) is configured to generate a first read output signal (Q_0), wherein the register bank (50) is configured to, in a read mode of at least one register (60) of the first plurality of registers (60): receive, in the read mode, the first read address signal (RD_ADDR_0) identifying the address of the at least one register (60) to be read; and generate, in the read mode, the first read output signal (Q_0) which corresponds to the datum stored in the at least one register (60) to be read.

In the initialization mode, the register bank (50) may be configured to initialize the registers (60) of the first plurality of registers (60) in succession to each other.

Each register (60) may include a second plurality of memory elements (70) of without-reset type.

Each register (60) of the first plurality of registers (60) may have a respective write datum input (60*a*) and a respective write enable input (60*b*), wherein the write datum input (60*a*) of each register ($60_i$) forms the write datum input (50*a*) of the register bank (50), wherein the register bank (50) further comprises: a decoder (62) having an input (62*a*) and having a respective output ($62b_i$) for each register (60), the input (62*a*) of the decoder (62) forming the write address input (50*c*) of the register bank (50) and being configured to receive the write address signal (WR_ADDR); and a respective main AND logic gate (64) for each register (60), each main AND logic gate (64) being of AND type and respectively having a first input (64*a*), a second input (64*b*) and an output (64*c*), wherein the first input (64*a*) of each main AND logic gate ($64_i$) is connected to a respective output ($62b_i$) of the decoder (62), the second input (64*b*) of each main AND logic gate ($64_i$) forms the write enable input (50*b*) of the register bank (50) and is configured to receive the write enable signal (WR_EN) and the output (64*c*) of each main AND logic gate ($64_i$) is connected to the write enable input (60*b*) of a respective register ($60_i$) of the registers (60).

An electronic processor (10) may be summarized as including: a register bank (50), as discussed above; a control unit (20) configured to generate a control signal (SEL), the write enable signal (WR_EN) and the write address signal (WR_ADDR); an input datum multiplexer (52), which has at least a first input (52*a*), a second input (52*b*), a control input (52*e*) and an output (52*d*), the first input (52*a*) being configured to receive an operating datum (D_SENS; D_ALU), the second input (52*b*) being configured to acquire the initialization datum (D_INIT), the control input (52*e*) being connected to the control unit (20) and being configured to receive, from the control unit (20), the control signal (SEL), the input datum multiplexer (52) being configured to transmit to the output (52*d*) the operating datum (D_SENS; D_ALU) or the initialization datum (D_INIT), on the basis of the control signal (SEL), wherein the write datum input (50*a*) is connected to the output (52*d*) of the input datum multiplexer (52) and wherein the write enable input (50*b*) and the write address input (50*c*) are connected to the control unit (20), wherein the write datum input (50*a*) is configured to receive from the input datum multiplexer (52) the operating datum (D_SENS; D_ALU) and the initialization datum (D_INIT), the write enable input (50*b*) is configured to receive from the control unit (20) the write enable signal (WR_EN) and the write address input (50*c*) is configured to receive from the control unit (20) the write address signal (WR_ADDR), wherein, in the initialization mode of the at least one register (60) of the first plurality of registers (60), the control unit (20) is configured to: set, in the initialization mode, the control signal (SEL) in such a way that the input datum multiplexer (52) transmits to the output (52*d*) the initialization datum (D_INIT); set, in the initialization mode, the write enable signal (WR_EN) to a value identifying the enabling of the update of the at least one register (60) to be initialized; and set, in the initialization mode, the write address signal (WR_ADDR) to a value identifying the address of the at least one register (60) to be initialized.

The electronic processor's (10) registers (60) may be of without-reset type.

The electronic processor (10) may further include: an instruction register (12) which comprises a multiplicity of memory registers and is configured to store one or more instructions to be executed by the processor (10); a load-and-store unit (14), which comprises a respective multiplicity of further memory registers and is configured to store data usable by the processor (10); and an arithmetic-logic unit (32), wherein the input datum multiplexer (52) further has a third input (52*c*), wherein the first input (52*a*) is connected to the load-and-store unit (14) to receive the operating datum corresponding to a sensor datum (D_SENS) stored in the load-and-store unit (14), the second input (52*b*) is connected to a reference node (GND) of the electronic processor (10) to acquire the initialization datum (D_INIT), the third input (52*c*) is connected to the arithmetic-logic unit (32) to receive an ALU datum (D_ALU) generated by the arithmetic-logic unit (32), wherein the input datum multiplexer (52) is configured to transmit to the output (52*d*) one of the sensor datum (D_SENS), the ALU datum (D_ALU) and the initialization datum (D_INIT), on the basis of the control signal (SEL).

An initialization method of a register bank (50) may be summarized as including, in the initialization mode of the at least one register (60) of the first plurality of registers (60), the steps of: a. receiving, in the initialization mode and through the register bank (50), the initialization datum (D_INIT); b. receiving, in the initialization mode and through the register bank (50), the write enable signal (WR_EN) identifying the enabling of the update of the at least one register (60) to be initialized; c. receiving, in the initialization mode and through the register bank (50), the write address signal (WR_ADDR) identifying an address of the at least one register (60) to be initialized; and d. in response to receiving the write enable signal (WR_EN), storing, through the register bank (50), the initialization datum (D_INIT) in the at least one register (60) to be initialized.

The initialization method may further include performing steps a-d for each register (60) of the first plurality of registers (60) of the register bank (50).

The registers (60) may be of without-reset type, wherein each register (60) comprises a second plurality of memory elements (70) of without-reset type, and wherein the initialization datum (D_INIT) is formed by a number of bits equal to said second plurality, each bit of the initialization datum (D_INIT) being equal to an initialization value ('0').

A control method (100) of an electronic processor (10) may be summarized as including the steps of: controlling the electronic processor (10) in a default unknown state (104) up to receiving by the control unit (20) a reset signal (RST) indicative of an initialization request of the registers (60) of the register bank (50); in response (106) to receiving by the control unit (20) the reset signal (RST) and until (110) an initialization completed signal (DONE) is generated by the control unit (20), indicative of the completion of the initialization of the registers (60) of the register bank (50), initializing the registers (60) of the register bank (50) through an initialization method discussed above; in response (110) to generating by the control unit (20) the initialization completed signal (DONE) and until (114) an operation start signal (START) is received by the electronic processor (10), indicative of instruction execution start, controlling the processor (10) in an idle state (112); and in response (114) to receiving by the control unit (20) the operation start signal (START), controlling the processor (10) into an operation execution state (116-124).

The step of controlling the processor (10) in the operation execution state (116-124) may include, in the write mode of at least one register (60) of the first plurality of registers (60): receiving, in the write mode and through the register bank (50), the operating datum (D_SENS; D_ALU); receiving, in the write mode and through the register bank (50), the write enable signal (WR_EN) identifying the enabling of the update of the at least one register (60) to be overwritten; receiving, in the write mode and through the register bank (50), the write address signal (WR_ADDR) identifying the address of the at least one register (60) to be overwritten; and in response to receiving the write enable signal (WR_EN), storing, through the register bank (50), the operating datum (D_SENS; D_ALU) in the at least one register (60) to be overwritten.

A computer program product may be summarized as storable in an electronic processor (10) and designed such that, when executed on the electronic processor (10), the electronic processor (10) becomes configured to perform an initialization method of a register bank (50) of the electronic processor (10), as described above, or a control method of the electronic processor (10), as described above.

In an embodiment, a register bank comprises: a first plurality of without-reset registers; a write input coupled to the first plurality of without-reset registers; a write-enable input coupled to the first plurality of without-reset registers; and a write-address input coupled to the first plurality of without-reset registers. The register bank has a plurality of operating modes including an initialization mode of operation and a write mode of operation. In the initialization mode of operation, the register bank responds to receipt of a write-enable signal on the write-enable input by storing initialization data received on the write input into a register of the first plurality of without-reset registers based on a write-address signal received on the write-address input.

In an embodiment, in the write mode of operation, the register bank responds to receipt of a write-enable signal on the write-enable input by storing operating data received on the write input into a register of the first plurality of without-reset registers based on a write-address signal received on write-address input.

In an embodiment, the register bank comprising: a first read address input; and a first read output, wherein the plurality of operating modes include a read mode of operation, and in the read mode of operation, the register bank responds to receipt of a read-address on the first read address input by generating an output on the first read output based on data stored in a register of the first plurality of without-reset registers corresponding to the read-address on the first read address input.

In an embodiment, in the initialization mode of operation, the register bank sequentially initializes the registers of the first plurality of without-reset registers.

In an embodiment, each register of the first plurality of without-reset registers comprises a plurality of without-reset memory elements.

In an embodiment, the without-reset memory elements comprise without-reset flip-flops.

In an embodiment, the register bank comprises: decoding circuitry coupled to the write-address input and to the write-enable input, wherein the decoding circuitry, in operation, selectively enables registers of the first plurality of without-reset registers based on the write-enable signal on the write-enable input and the write-address signal on write-address input. In an embodiment, the decoding circuitry comprises: an address decoder, which, in operation, decodes the write-address signal on the write-address input; and a plurality of AND logic gates each having a first input coupled to respective outputs of the address decoder and a second input coupled to the write-enable input of the register bank. Each register of the plurality of without-reset registers has a respective register write-enable input coupled an output of a respective AND logic gate of the plurality of AND logic gates.

In an embodiment, an electronic processor comprises a register bank, including: a first plurality of without-reset registers; a write input coupled to the first plurality of without-reset registers; a write-enable input coupled to the first plurality of without-reset registers; and a write-address input coupled to the first plurality of without-reset registers, wherein, the register bank has a plurality of operating modes including an initialization mode of operation and a write mode of operation, and in the initialization mode of operation, the register bank responds to receipt of a write-enable signal on the write-enable input by storing initialization data received on the write input into a register of the first plurality of without-reset registers based on a write-address signal received on the write-address input. The electronic processor includes control circuitry coupled to the register bank, wherein the control circuitry, in operation, generates a control signal, the write-enable signal and the write-address signal. The electronic processor includes a multiplexer having: a plurality of data inputs including: a first data input, which, in operation, receives operating data signals; a second data input, which, in operation, receives initialization data signals; a control input coupled to the control circuitry, wherein, in operation, the control input receives the control signal; and an output coupled to the write input of the register bank, wherein the multiplexer, in operation, couples one of the plurality of data inputs of the multiplexer to the output of the multiplexer based on the control signal.

In an embodiment, the electronic processor comprises: an instruction register having a plurality of memory registers, wherein the instruction register, in operation, stores instructions executable by the electronic processor; load-and-store circuitry (LSU) having a plurality of memory registers, wherein the LSU, in operation, stores operating data; and an arithmetic-logic circuitry (ALU), which, in operation, performs arithmetic operations, wherein, the plurality of data inputs of the multiplexer includes a third data input coupled to the ALU, the first data input of the multiplexer is coupled to the LSU, and the second data input of the multiplexer is coupled to a reference node of the electronic processor.

In an embodiment, the electronic processor comprises: one or more sensors coupled to the LSU, wherein the LSU, in operation, stores data generated by the one or more sensors.

In an embodiment, a method comprises: operating a register bank having a plurality of operational modes in an initialization mode of operation, the plurality of operational modes including the initialization mode of operation and a write mode of operation; and responding to receipt of a write-enable signal by the register bank during the initialization mode of operation by storing initialization data into a register of a plurality of without-reset registers of the register bank based on a write-address received by the register bank.

In an embodiment, the method comprises: operating the register bank in the write mode of operation; and responding to receipt of a write-enable signal by the register bank during the write mode of operation by storing operating data into a register of the plurality of without-reset registers based on a write-address signal received by the register bank.

In an embodiment, the plurality of operational modes includes a read mode of operation, and the method comprises: operating the register bank in the read mode of operation; and responding to receipt of a read-address by the register bank by generating an output based on data stored in a register of the plurality of without-reset registers corresponding to the read-address.

In an embodiment, the method comprises, in the initialization mode of operation, sequentially initializing the registers of the plurality of without-reset registers.

In an embodiment, the method comprises: selectively enabling registers of the plurality of without-reset registers based on the write-enable signal and the received write-address.

In an embodiment, the method comprises: receiving a reset signal; and responding to the reset signal by operating the register bank in the initialization mode of operation.

In an embodiment, a method comprises: operating a processor having a register bank in one of a plurality of operational modes, the plurality of operational modes including a reset mode, a write mode, and a read mode; responding to receipt of a write-enable signal by the register bank during the reset mode of operation by storing initialization data into one or more registers of a plurality of without-reset registers of the register bank based on write-addresses received by the register bank; and responding to receipt of a write-enable signal by the register bank during the write mode of operation by storing operating data into one or more registers of the plurality of without-reset registers of the register bank based on write-addresses received by the register bank.

In an embodiment, the method comprises, in the reset mode of operation, sequentially initializing the registers of the plurality of without-reset registers.

In an embodiment, a non-transitory computer-readable medium's contents cause a processing system to perform a method, the method comprising: operating the processing system in one of a plurality of operational modes, the plurality of operational modes including a reset mode, a write mode, and a read mode; responding to receipt of a write-enable signal by a register bank of the processing system during the reset mode of operation by storing initialization data into one or more registers of a plurality of without-reset registers of the register bank based on write-addresses received by the register bank; and responding to receipt of a write-enable signal by the register bank during the write mode of operation by storing operating data into one or more registers of the plurality of without-reset registers of the register bank based on write-addresses received by the register bank.

In an embodiment, the method comprises, in the reset mode of operation, sequentially initializing the registers of the plurality of without-reset registers.

In an embodiment, the contents comprise instructions executable by the processing system.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A register bank, comprising:

a first plurality of without-reset registers;

a write input coupled to the first plurality of without-reset registers;

a write-enable input coupled to the first plurality of without-reset registers;

a write-address input coupled to the first plurality of without-reset registers;

a multiplexer having an output coupled to the write input of the first plurality of without-reset registers, an initialization data input, an ALU data input, and a sensor data input; and decoding circuitry coupled to the write-address input and to the write-enable input, the decoding circuitry including:

an address decoder, which, in operation, decodes a write-address signal on the write-address input; and a plurality of AND logic gates each having a first input coupled to respective outputs of the address decoder and a second input coupled to the write-enable input of the register bank, wherein, the multiplexer, in operation, selectively couples the initialization data input, the ALU data input, or the sensor data input to the write input of the register block, the register bank has a plurality of operating modes including an initialization mode of operation and a write mode of operation, the decoding circuitry, in operation, selectively enables registers of the first plurality of without-reset registers based on a write-enable signal on the write-enable input and the write-address signal on the write-address input, each register of the plurality of without-reset registers has a respective register write-enable input coupled to an output of a respective AND logic gate of the plurality of AND logic gates of the decoding circuitry, and in the initialization mode of operation, the multiplexer couples the initialization data input to write input of the register block and the register bank responds to receipt of a write-enable signal on the write-enable input by sequentially storing initialization data received on the write input into a register of the first plurality of without-reset registers based on a write-address signal received on the write-address input.

2. The register bank according to claim 1, wherein in the write mode of operation, the register bank responds to receipt of a write-enable signal on the write-enable input by storing operating data received on the write input into a register of the first plurality of without-reset registers based on a write-address signal received on the write-address input.

3. The register bank according to claim 1, comprising:

a first read address input; and a first read output, wherein the plurality of operating modes includes a read mode of operation, and in the read mode of operation, the register bank responds to receipt of a read-address on the first read address input by generating an output on the first read output based on data stored in a register of the first plurality of without-reset registers corresponding to the read-address on the first read address input.

4. The register bank according to claim 1, wherein each register of the first plurality of without-reset registers comprises a plurality of without-reset memory elements.

5. The register bank of claim 4, wherein the without-reset memory elements comprise without-reset flip-flops.

6. An electronic processor, comprising:

a register bank, including:

a first plurality of without-reset registers;

a write input coupled to the first plurality of without-reset registers;

a write-enable input coupled to the first plurality of without-reset registers; and a write-address input coupled to the first plurality of without-reset registers, wherein, the register bank has a plurality of operating modes including an initialization mode of operation and a write mode of operation, and in the initialization mode of operation, the register bank responds to receipt of a write-enable signal on the write-enable input by sequentially storing initialization data received on the write input into a register of the first plurality of without-reset registers based on a write-address signal received on the write-address input;

control circuitry coupled to the register bank, wherein the control circuitry, in operation, generates a control signal, the write-enable signal and the write-address signal;

a multiplexer, having:

a plurality of data inputs including:

a first data input, which, in operation, receives sensor data signals;

a second data input, which, in operation, receives initialization data signals;

a third data input, which, in operation, receives arithmetic-logic signals; and a control input coupled to the control circuitry, wherein, in operation, the control input receives the control signal; and an output coupled to the write input of the register bank, wherein the multiplexer, in operation, couples one of the plurality of data inputs of the multiplexer to the output of the multiplexer based on the control signal;

an instruction register having a plurality of memory registers, wherein the instruction register, in operation, stores instructions executable by the electronic processor;

load-and-store circuitry (LSU) having a plurality of memory registers, wherein the LSU, in operation, stores operating data;

an arithmetic-logic circuitry (ALU), which, in operation, performs arithmetic operations; and one or more sensors coupled to the LSU, wherein the LSU, in operation, stores data generated by the one or more sensors, wherein, the third data input is coupled to the ALU, the first data input of the multiplexer is coupled to the LSU, and the second data input of the multiplexer is coupled to a reference node of the electronic processor.

7. A method, comprising:

operating a register bank having a plurality of operational modes, the plurality of operational modes including an initialization mode of operation and a write mode of operation;

controlling a multiplexer to selectively couple an input of a plurality of inputs to a write input of the register bank, the plurality of inputs including an initialization data input, an ALU data input, and a sensor data input; and responding to receipt of a write-enable signal by the register bank during the initialization mode of operation by controlling the multiplexer to couple the initialization data input to the write input of the register bank and sequentially storing initialization data into registers of a plurality of without-reset registers of the register bank based on a write-address received by the register bank, wherein, the register bank includes:

a first plurality of without-reset registers;

a write input coupled to the first plurality of without-reset registers;

a write-enable input coupled to the first plurality of without-reset registers;

a write-address input coupled to the first plurality of without-reset registers; and decoding circuitry coupled to the write-address input and to the write-enable input, the decoding circuitry including:

an address decoder, which, in operation, decodes a write-address signal on the write-address input; and a plurality of AND logic gates each having a first input coupled to respective outputs of the address decoder and a second input coupled to the write-enable input of the register bank, the multiplexer has an output coupled to the write input of the first plurality of without-reset registers, the decoding circuitry, in operation, selectively enables registers of the first plurality of without-reset registers based on a write-enable signal on the write-enable input and the write-address signal on the write-address input, and each register of the plurality of without-reset registers has a respective register write-enable input coupled to an output of a respective AND logic gate of the plurality of AND logic gates of the decoding circuitry.

8. The method according to claim 7, comprising:

operating the register bank in the write mode of operation; and responding to receipt of a write-enable signal by the register bank during the write mode of operation by storing operating data into a register of the plurality of without-reset registers based on a write-address signal received by the register bank, wherein the operating data comprises sensor data or arithmetic logic data.

9. The method of claim 7, wherein the plurality of operational modes includes a read mode of operation, the method comprising:

operating the register bank in the read mode of operation; and responding to receipt of a read-address by the register bank by generating an output based on data stored in a register of the plurality of without-reset registers corresponding to the read-address.

10. The method of claim 7, comprising:

receiving a reset signal; and responding to the reset signal by operating the register bank in the initialization mode of operation.

11. A method, comprising:

operating a processor having a register bank and a multiplexer in one of a plurality of operational modes, the plurality of operational modes including a reset mode, a write mode, and a read mode;

controlling the multiplexer to selectively couple an input of a plurality of inputs to a write input of the register bank, the plurality of inputs including an initialization data input, an ALU data input, and a sensor data input;

responding to receipt of a write-enable signal by the register bank during the reset mode of operation by:

controlling the multiplexer to couple the initialization data input to the write input of the register bank; and sequentially storing initialization data into registers of a plurality of without-reset registers of the register bank based on write-addresses received by the register bank; and responding to receipt of a write-enable signal by the register bank during the write mode of operation by:

controlling the multiplexer to couple the ALU data input or the sensor data input to the write input of the register bank; and storing operating data into one or more registers of the plurality of without-reset registers of the register bank based on write-addresses received by the register bank, wherein, the register bank includes:

a first plurality of without-reset registers;

a write input coupled to the first plurality of without-reset registers;

a write-enable input coupled to the first plurality of without-reset registers;

a write-address input coupled to the first plurality of without-reset registers; and decoding circuitry coupled to the write-address input and to the write-enable input, the decoding circuitry including:

an address decoder, which, in operation, decodes a write-address signal on the write-address input; and a plurality of AND logic gates each having a first input coupled to respective outputs of the address decoder and a second input coupled to the write-enable input of the register bank, the multiplexer has an output coupled to the write input of the first plurality of without-reset registers, the decoding circuitry, in operation, selectively enables registers of the first plurality of without-reset registers based on a write-enable signal on the write-enable input and the write-address signal on the write-address input, and each register of the plurality of without-reset registers has a respective register write-enable input coupled to an output of a respective AND logic gate of the plurality of AND logic gates of the decoding circuitry.

12. A non-transitory computer-readable medium storing instructions which cause a processor to perform a method, the method comprising:

operating the processor in one of a plurality of operational modes, the plurality of operational modes including a reset mode, a write mode, and a read mode;

controlling a multiplexer of the processor to selectively couple an input of a plurality of inputs to a write input of a register bank of the processor, the plurality of inputs including an initialization data input, an ALU data input, and a sensor data input;

responding to receipt of a write-enable signal by the register bank during the reset mode of operation by:

controlling the multiplexer to couple the initialization data input to the write input of the register bank; and sequentially storing initialization data into registers of a plurality of without-reset registers of the register bank based on write-addresses received by the register bank; and responding to receipt of a write-enable signal by the register bank during the write mode of operation by:

controlling the multiplexer to couple the ALU data input or the sensor data input to the write input of the register bank; and storing operating data into one or more registers of the plurality of without-reset registers of the register bank based on write-addresses received by the register bank, wherein, the register bank includes:

a first plurality of without-reset registers;

a write input coupled to the first plurality of without-reset registers;

a write-enable input coupled to the first plurality of without-reset registers;

a write-address input coupled to the first plurality of without-reset registers; and decoding circuitry coupled to the write-address input and to the write-enable input, the decoding circuitry including:

an address decoder, which, in operation, decodes a write-address signal on the write-address input; and a plurality of AND logic gates each having a first input coupled to respective outputs of the address decoder and a second input coupled to the write-enable input of the register bank, the multiplexer has an output coupled to the write input of the first plurality of without-reset registers, the decoding circuitry, in operation, selectively enables registers of the first plurality of without-reset registers based on a write-enable signal on the write-enable input and the write-address signal on the write-address input, and each register of the plurality of without-reset registers has a respective register write-enable input coupled to an output of a respective AND logic gate of the plurality of AND logic gates of the decoding circuitry.

13. The register bank of claim 1, comprising:

a clock, which, in operation, generates a clock signal; and control circuitry, which, in operation:

implements a finite state machine (FSM);

generates a write-enable signal, a write-address signal, and a select signal based on a state of the FSM and the clock signal; and controls the multiplexer based on the select signal.

14. The electronic processor of claim 6, comprising:

a clock, which, in operation, generates a clock signal, wherein the control circuitry, in operation:

implements a finite state machine (FSM); and generates the control signal, the write-enable signal, and the write-address signal based on a state of the FSM and the clock signal.

15. The method of claim 7, comprising:

generating a clock signal;

implementing a finite state machine (FSM);

generating the write-enable signal, the write-address signal, and a select signal based on a state of the FSM and the clock signal; and controlling the multiplexer based on the select signal.

16. The method of claim 11, comprising:

generating a clock signal;

implementing a finite state machine (FSM);

generating the write-enable signal, a write-address signal, and a select signal based on a state of the FSM and the clock signal; and controlling the multiplexer based on the select signal.

17. The non-transitory computer-readable medium of claim 12, wherein the method comprises:

generating a clock signal;

implementing a finite state machine (FSM);

generating the write-enable signal, a write-address signal, and a select signal based on a state of the FSM and the clock signal; and controlling the multiplexer based on the select signal.

* * * * *